Feb. 27, 1962 G. KARGL 3,022,706
PORTABLE PHOTOGRAMMETRIC RECTIFIER
Filed June 18, 1958 9 Sheets-Sheet 7
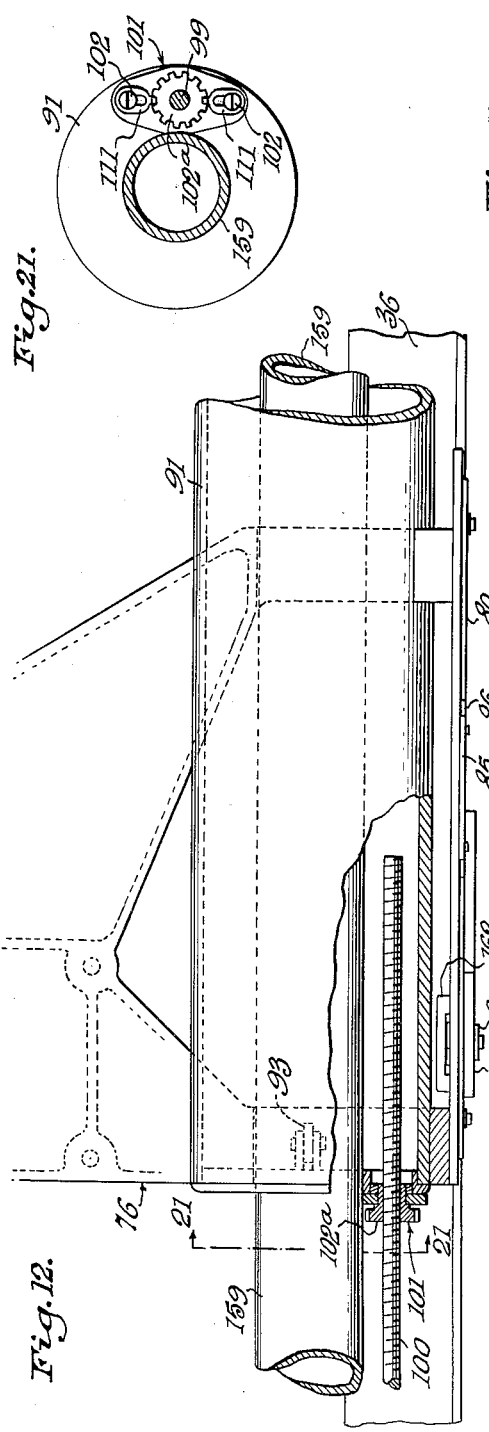
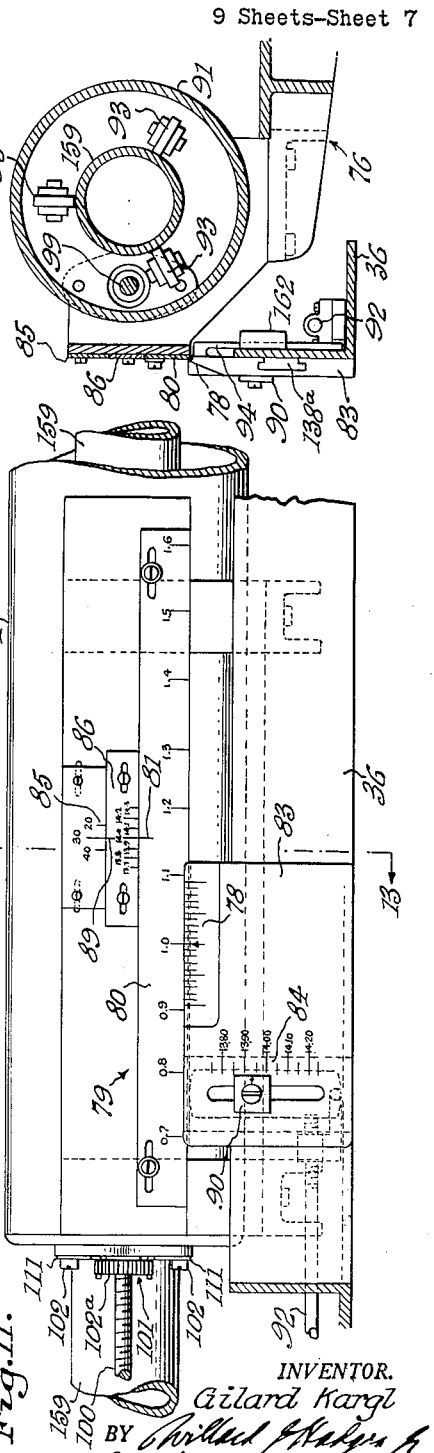
INVENTOR.
Gilard Kargl
BY
ATTORNEYS

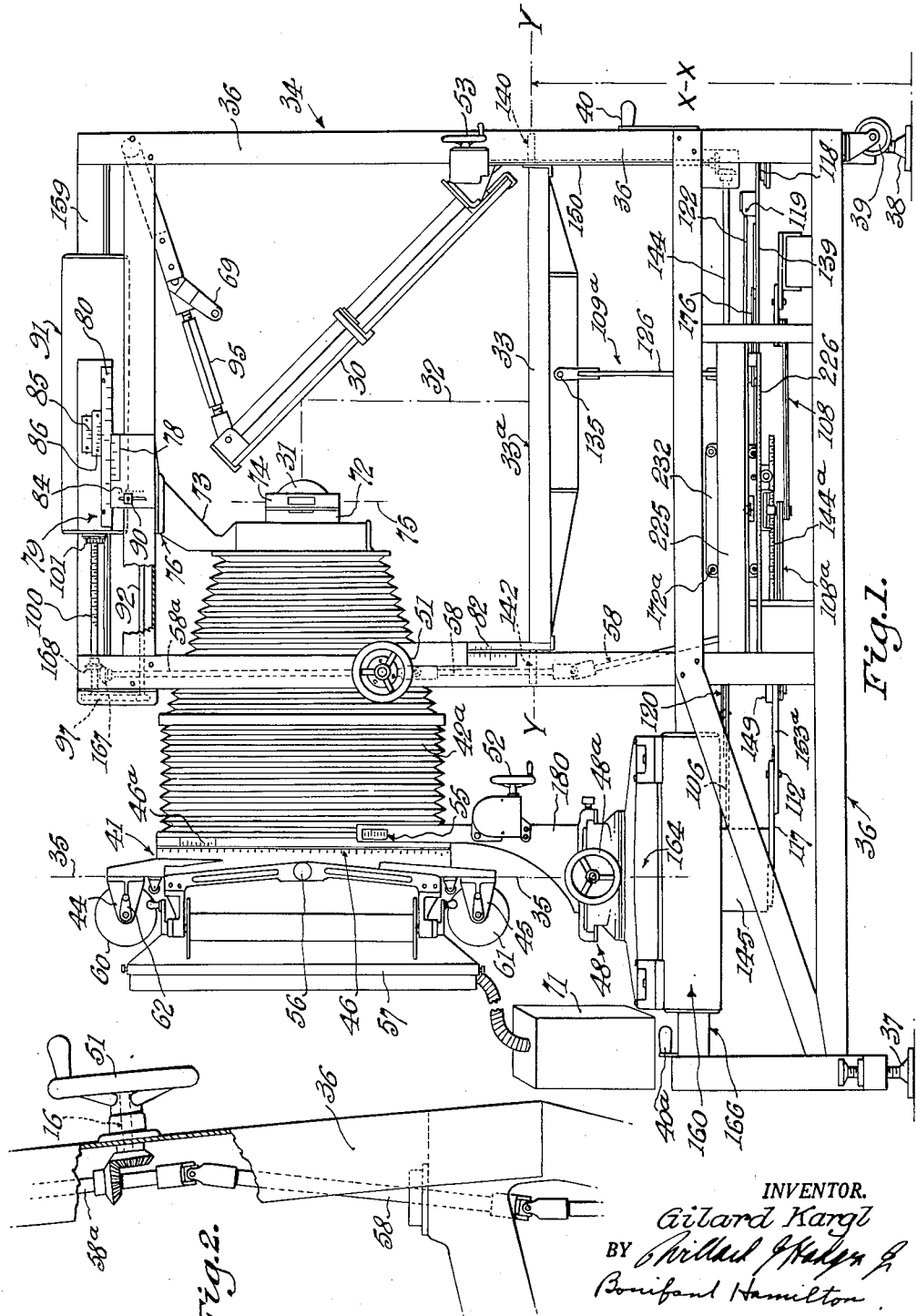

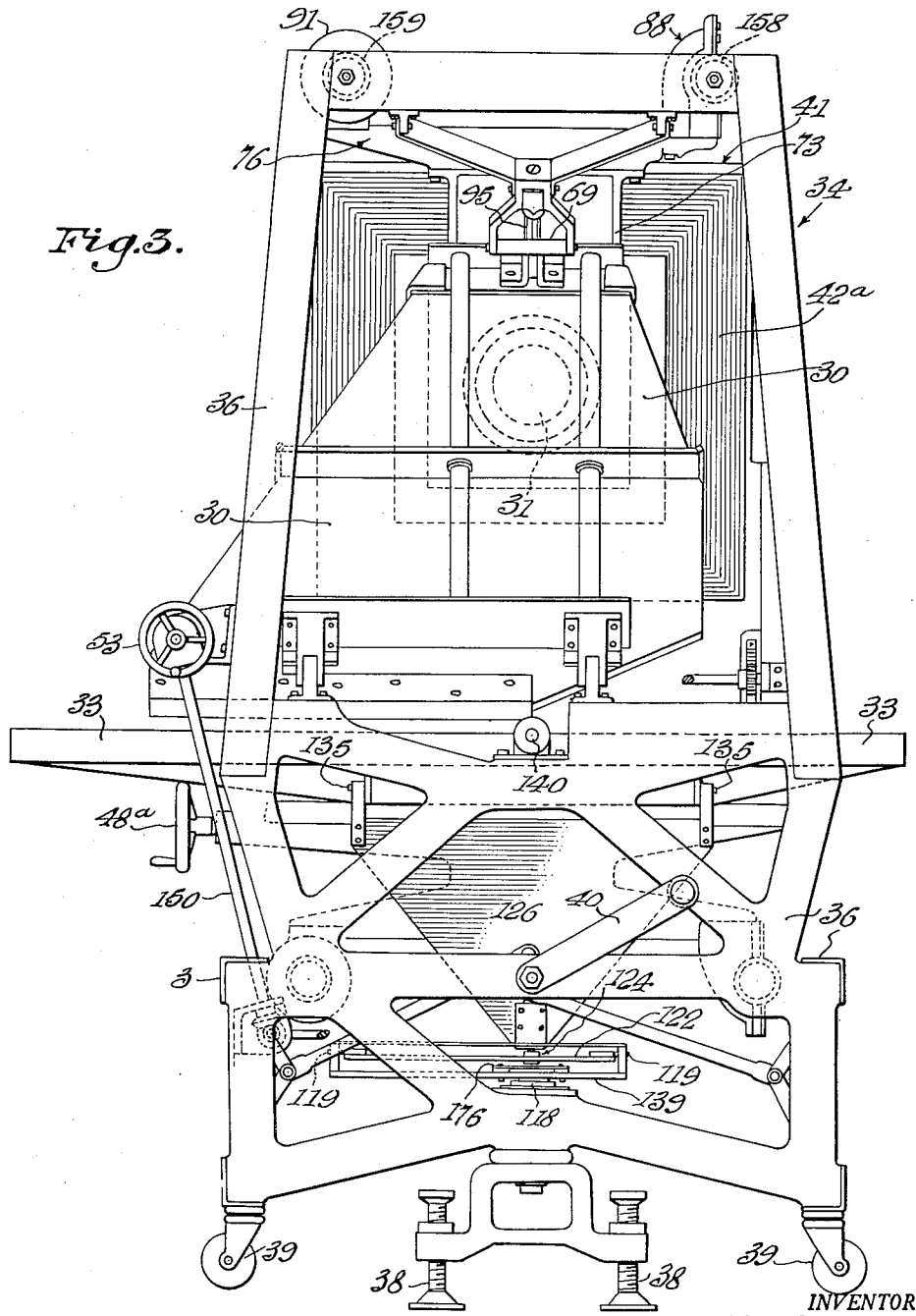

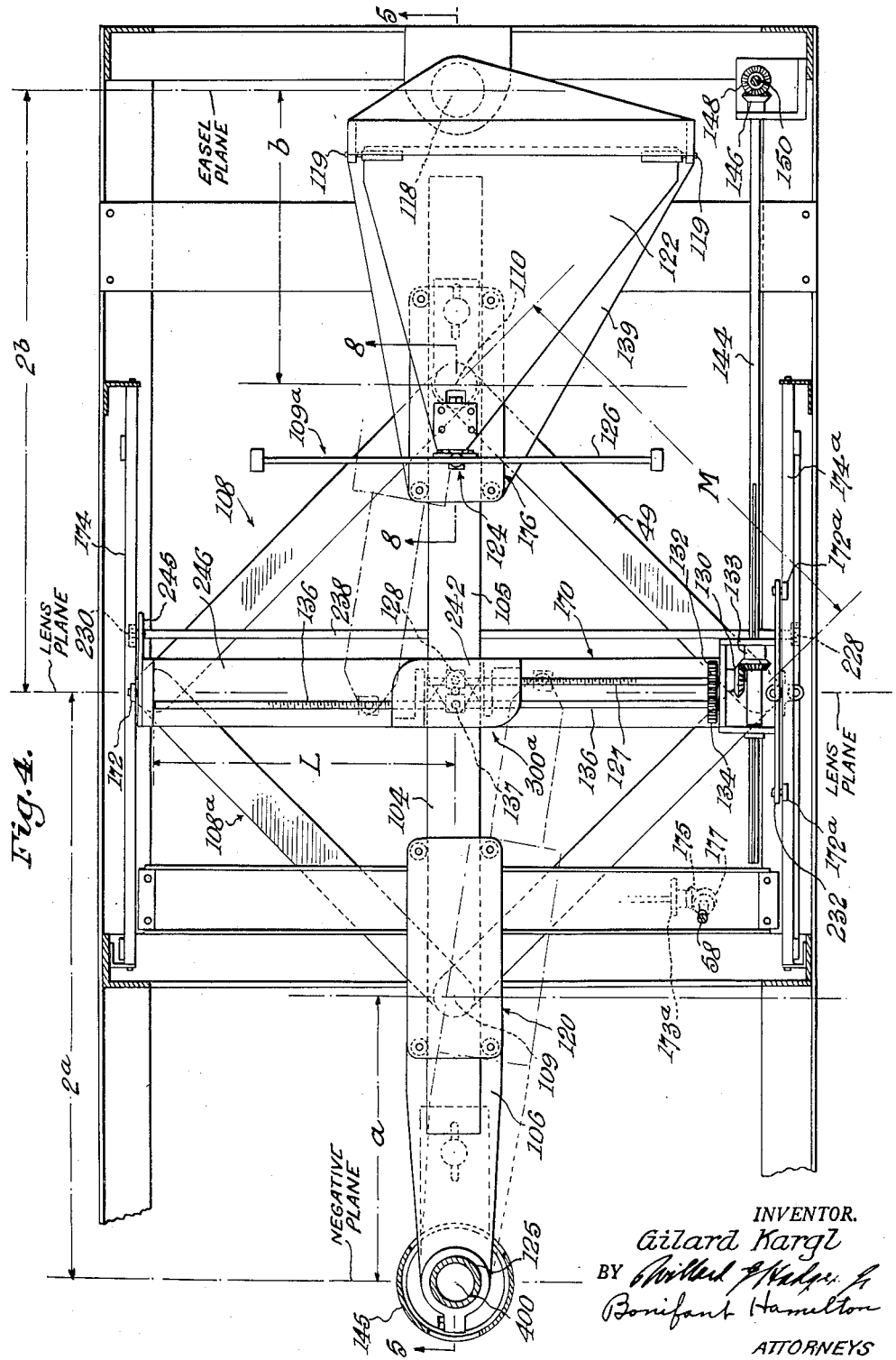

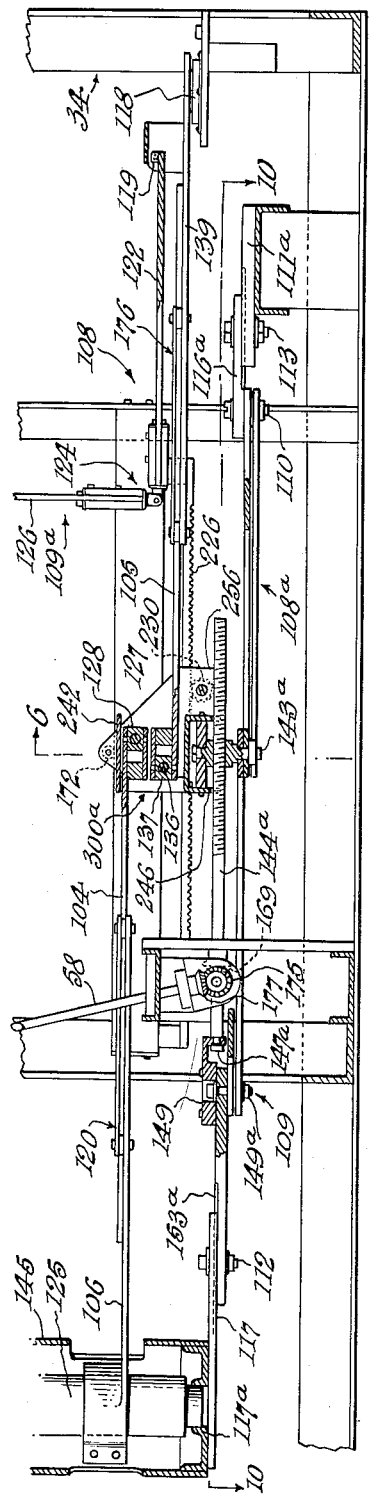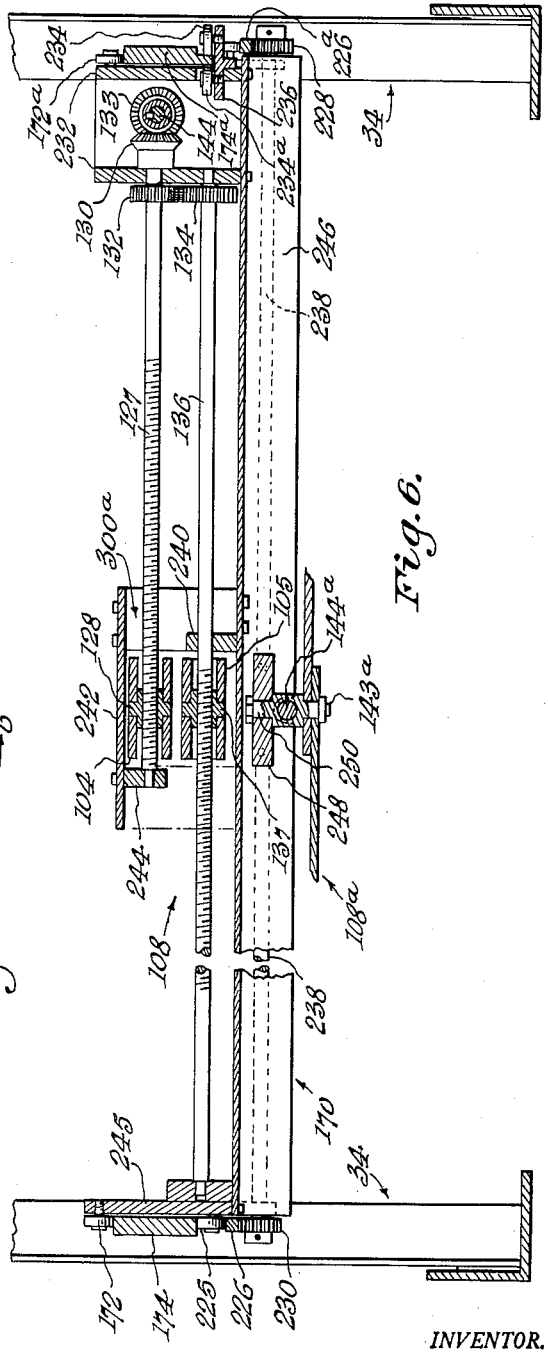

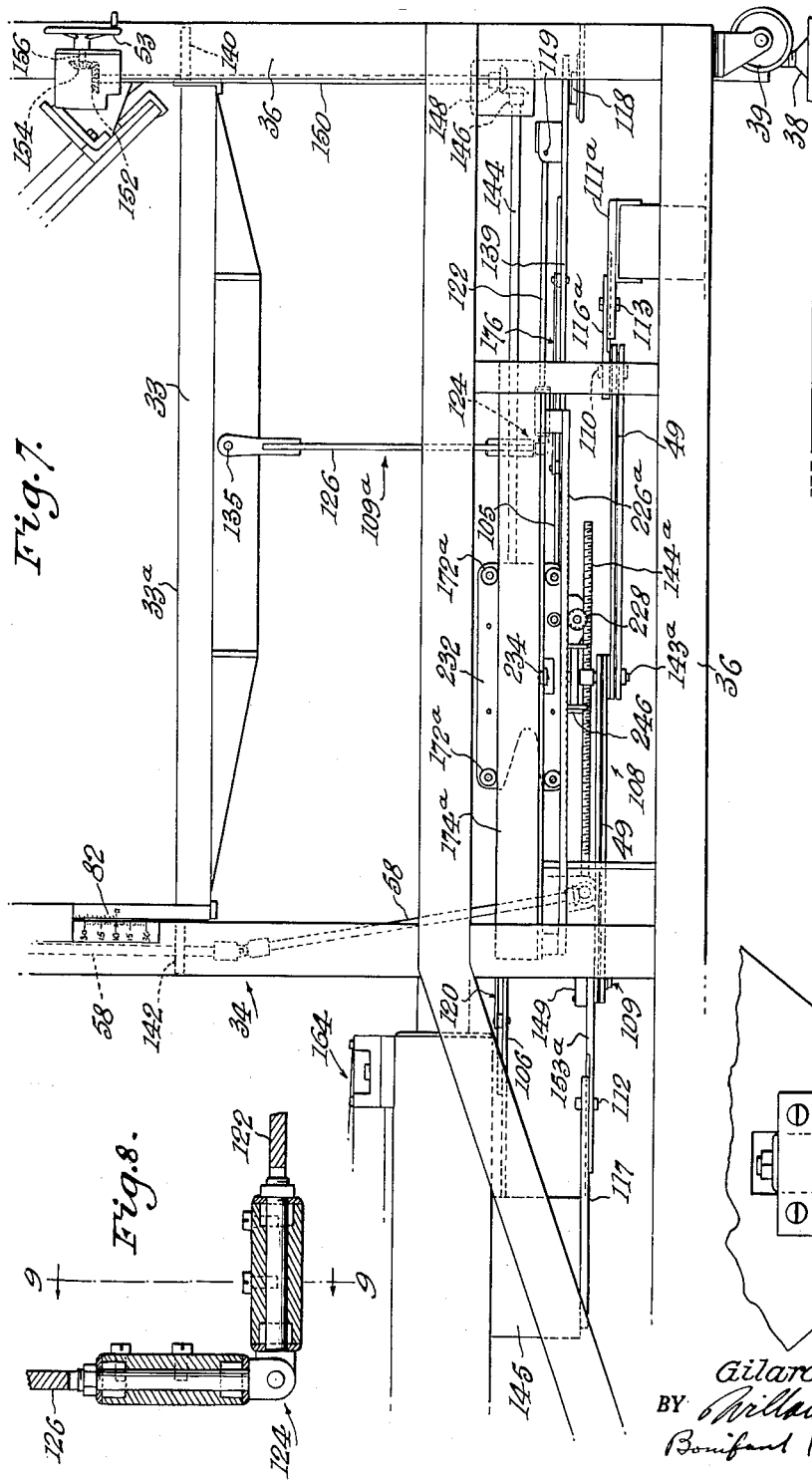

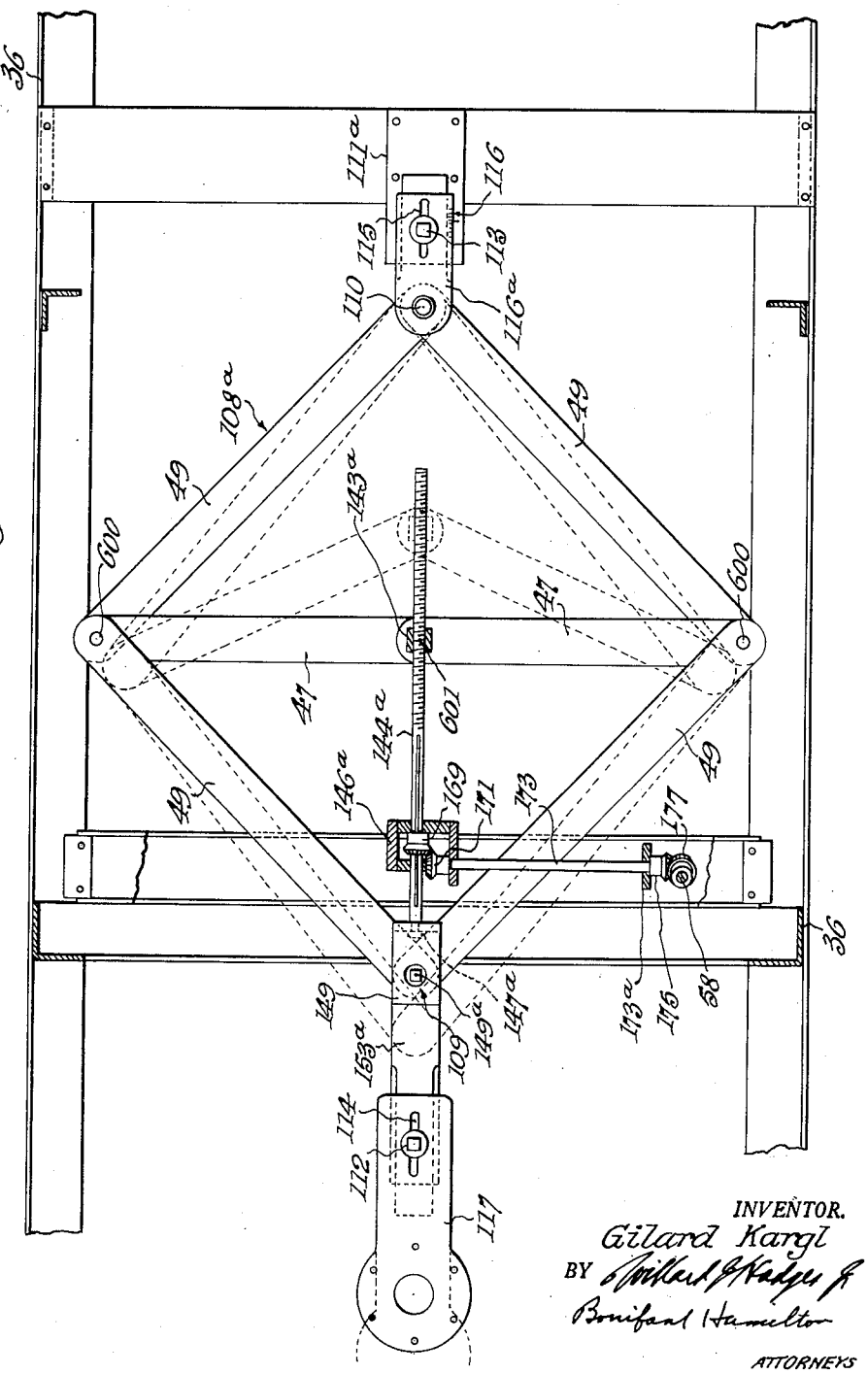

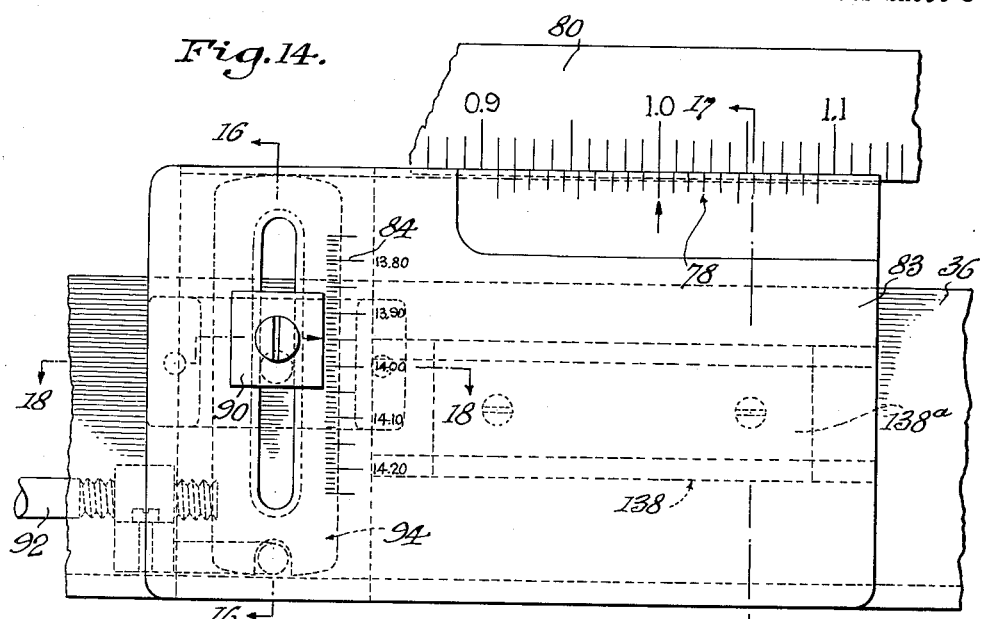
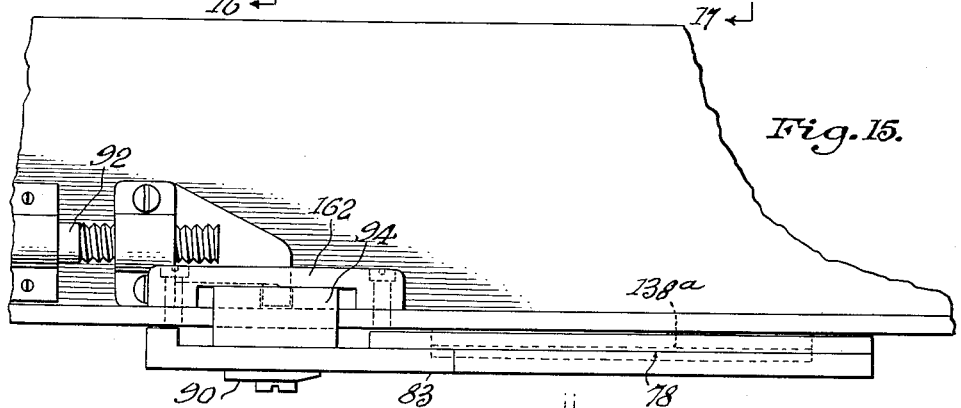
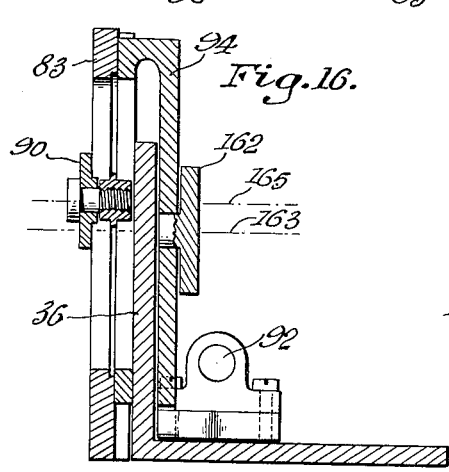
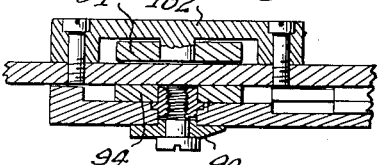
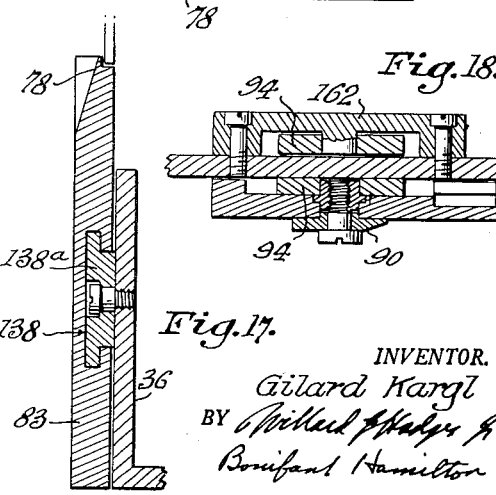

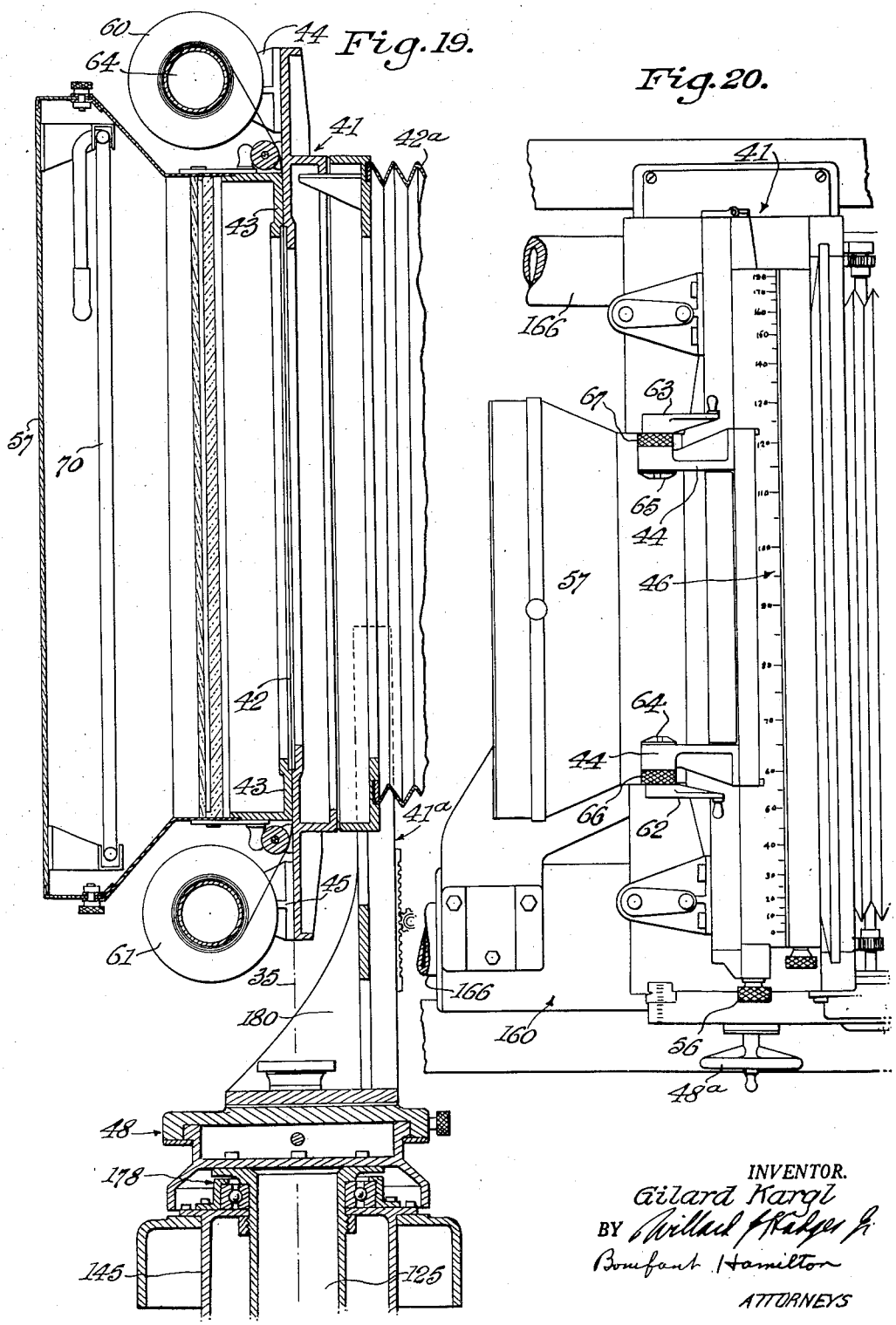

3,022,706
Patented Feb. 27, 1962

3,022,706
PORTABLE PHOTOGRAMMETRIC RECTIFIER
Gilard Kargl, San Antonio, Tex., assignor to the United States of America as represented by the Secretary of the Army
Filed June 18, 1958, Ser. No. 742,971
7 Claims. (Cl. 88—24)

This invention relates to improvements in the art of photogrammetric rectifiers suitable for high altitude photography, and more especially to a portable and compact type of photogrammetric rectifier, suitable for mounting where space limitations are an important consideration, permitting use of a reflected lens ray in which a rectifier lens of longer focal length may be used than is presently used in conventional types of rectifiers, which is capable of correcting aerial negatives for image displacement due to lens aberration, plane tilt, swing, crabbing, correction of terrain height, and other errors in the negative in order that pictorial information of the negatives may be translated into the various forms of maps as desired in topography, photogrammetry or three-dimensional terrain models. Rectification is a process of reprinting aerial photographs by which distortions due to plane tip and tilt with other variables such as height in aerial photographs are reduced to a minimum.

It is a primary object of this invention to provide a portable photogrammetric rectifier means adapted to use a projection lens having a long focal length sufficient to accurately reproduce aerial negatives taken at high altitudes.

It is another object of this invention to provide an instrumentality adapted to extend the optical limits of photogrammetric rectifiers.

It is a further object of this invention to provide an instrumentality adapted to extend the physical limits of a photogrammetric rectifier which is adapted to be used as a portable machine suitable for transportation in military field service.

A further object of this invention is to provide a novel ratio scale indicator for a photogrammetric rectifier which is adapted to take care of slight deviations from the nominal focal length of projection lenses, thereby coordinating the projected scale of the image with the indicator scale of the projector.

A still further object of this invention is to provide a photogrammetric rectifier adapted to use, interchangeably, lenses each of which may be of a different focal length.

Another object of this invention is to provide a photogrammetric rectifier having suitable physical couplings of optical planes to each other capable for satisfying mathematical requirements as required in the "Scheimpflug" condition of U.S. Patent No. 752,596 and well known in the art, which are of suitable tolerance to assure accurate results in rectifications.

A further object of this invention is to provide a compact photogrammetric rectifier of a unique design utilizing a 45 degree mirror type rectifier.

Another object of this invention is to provide a photogrammetric rectifier, the improvement of which consists in having the negative plane of the negative carrier, lens, and easel planes interconnected by inversor mechanisms and tilt control levers having varying radii so that the image produced on the easel is in critical focus over the entire tilt and magnification ranges in a substantially 45 degree mirror type rectifier.

A further object of this invention is to provide a universal ratio scale mechanism which accurately determines the image magnification, which is substantially the ratio of the distance along the optical axis from the lens plane to the easel plane to the distance from the negative plane to the lens plane, for the optimum axis magnification for a plurality of condenser lens, each of which may have a different focal length.

A still further object of this invention is to provide a multi-pivoted U-shaped mechanism for universally adapting a ratio scale to a plurality of lenses, each of which has a different focal length.

Another object of this invention is to provide a quickly adjustable calibrating means which connects the ratio scale mechanism to its drive mechanism to accurately calibrate the ratio scale for each negative, as desired.

A still further object of this invention is to provide a novel ratio scale indicator which functions to take care of deviations between nominal focal length and equivalent focal length of lenses and thereby coordinate the projected scale of the image with the indicated scale of the projector.

Another object of this invention is to provide a novel rectifier utilizing parallel driving means operated by the same actuating force to synchronously revolve the camera negative support with the tilted easel about two separate axes, lying in different planes and intersecting at right angles, to insure accurate rectification through the simultaneous coaction of the negative plane, lens plane and easel plane, such that all intersect in a common line for sharp focus of the rectifier image to produce accurate rectification of aerial photographs.

With these and other objects in view, the invention includes certain novel features hereinafter described with reference to the drawings which accompany and form a part of this specification.

In the drawings—

FIG. 1 is a side elevational view of the portable photogrammetric rectifier having substantially a 90 degree reflected lens ray in a preferred embodiment of the invention;

FIG. 2 is a partial broken away and enlarged view in elevation of handwheel and link means for the lens carrier of FIG. 1;

FIG. 3 is a front end elevational view of the preferred form of this invention;

FIG. 4 is a plan view of the autofocus mechanisms, parts being shown in section;

FIG. 5 is a side elevational view, partly in section, taken substantially on line 5—5 of FIG. 4;

FIG. 6 is a view in section taken on line 6—6 of FIG. 5;

FIG. 7 is an enlarged partial view in elevation of a portion of FIG. 1;

FIG. 8 is a detailed view in section of the plural axis universal joint taken on line 8—8 of FIG. 4;

FIG. 9 is a vertical view partly in section taken on line 9—9 of FIG. 8;

FIG. 10 is a horizontal view in section taken on line 10—10 of FIG. 5;

FIG. 11 is a partial side elevational view of the lens carrier and vernier;

FIG. 12 is a plan view of FIG. 11, parts being shown in section;

FIG. 13 is a sectional view taken on line 13—13 of FIG. 11;

FIG. 14 is an enlarged partial view in elevation of FIG. 11 to illustrate in detail the ratio scale mechanism;

FIG. 15 is a plan view of FIG. 14;

FIG. 16 is a vertical section illustrating the multi-pivoted U-shaped member of the ratio scale mechanism taken on line 16—16 of FIG. 14;

FIG. 17 is a detailed vertical section taken on line 17—17 of FIG. 14;

FIG. 18 is a detailed horizontal section taken on line 18—18 of FIG. 14;

FIG. 19 is an enlarged sectional view through the negative carrier;

FIG. 20 is a plan view of the negative carrier; and

FIG. 21 is a detailed sectional view taken on line 21—21 of FIG. 12.

Referring to the drawings, FIGS. 1 and 3 illustrate an embodiment of the invention which has combined features of both a horizontal and vertical type of photogrammetric rectifier in which the negative stage of the rectifier is in a vertical plane and the easel or projected image stage is in a horizontal plane. This type of arrangement permits mounting and transportation where space limitations are an important factor. The compactness of design is achieved by the use of mirror 30 in front of lens 31 to reflect the projection of the lens ray 32 substantially through a 90 degree angle upon the surface of easel 33. The rectifier 34 is of an autofocusing type in which easel 33 remains at a substantially fixed height designated in FIG. 1 as $x$—$x$, while lens 31 and negative plane 35 may be moved along the horizontal axis of the lens ray projection.

The optical system of rectifier 34 consists primarily of a movable and rotatably supported negative carrier 41, movable lens 31 and tiltable easel 33 cooperating in a separate plane with negative carrier 41 and lens 31 as shown in FIG. 1.

Rectifier 34 is designed so that easel 33 and negative plane 35 may be tilted relative to the axis of lens 31.

The optical and physical limits of all adjusting movements of the cooperating component parts of rectifier 34 are interdependent and automatically controlled by being interconnected by suitable linkages and other means designed to maintain sharp focus in the image projection at all possible settings of the rectifier, which will be hereinafter more fully illustrated and explained.

Rectifier 34 occupies a minimum of space, height and is well adapted to be transported and used in military field survey work.

Frame 36 of rectifier 34 consists mainly of suitable metal castings and structural angles fabricated and mounted substantially on a three-point support comprising feet 37 and 38 and retractable casters 39 of FIG. 3. Feet 37 and 38 are adjustable by screw thread means for leveling purposes, and retractable casters 39 are provided for maneuverability of rectifier 34. Casters 39 are retraced by means of levers 40 and 40a located on each end of rectifier 34, as shown in FIGS. 1 and 3.

FIG. 1 shows the composite assembly of the novel devices of the present invention in which the lens 31 is flexibly joined to negative carrier 41 by a light tight bellows 42a to insure proper containment and control of the light projection through negative of carrier 41 and through lens 31 permitting printing of the projected image on sensitized photographic material secured to top of easel 33. The detailed operation of each novel mechanism of instant invention will be more fully explained hereinafter.

Rectifier 34 may be used in the correction of copying from distorted aerial photographs from easel 33 if the negative of the photograph is not available for projection or printing upon easel 33 by exposing easel 33 to sufficiently strong light to record on the copying film in negative carrier 41.

The autofocus mechanism 108 of rectifier 34 is a combination of a scissor plural parallel bar inversor subassembly 108a and a multiple tilt control mechanism 300a, as shown in FIGS. 1, 4, and 5 for actuating the horizontal tilt of negative carrier 41 about its axis 35 together with lens focusing means to adjust lens 31 in proper focus for each desired magnification shown by ratio scale 80 in accordance with the well known "Scheimpflug" principle of U.S. Patent No. 752,596, as more fully described subsequently.

The negative holder 41 may be manually or otherwise rotated or adjusted about a horizontal, longitudinal axis and is independently rotated about a vertical axis by the autofocus mechanism 108 during the setting or adjustment of rectifier 34 for producing a desired rectification of an image.

Ratio scale mechanism 79, in general, comprises nodule scale 85, horizontal focal scale 86, ratio or magnification scale 80, with its accompanying magnification or ratio vernier scale 78, vertical focal scale 84 and variable or multipivoted U-shaped lever member 94 of FIGS. 11, 12, 13, 14, 15, 16, 17, and 18. Ratio scale 80, nodule scale 85 and focal scale 86 are adjustably attached to lens truck assembly member 91. Ratio vernier scale 78 containing slot 138 is moved slightly on guide bearing means 138a (FIGS. 14 and 17) by the coaction of U-shaped lever member 94 according to a desired manual setting of adjustable pivotal focal member 90 of FIG. 11 during the setting of rectifier 34 for a desired magnification of a photographic negative to compensate for slight variation of focal length of lens 31 as indicated on vertical focal scale 84.

Tilt control mechanism 300a, FIG. 4, comprises a worm driven tilt control lever 104 connected by sleeve means 120 and bar means 166 pivotally to rotary negative carrier support 125. Worm driven tilt control lever 105 is connected by sleeve or sheath lever means 176 connected to lever member 139 which pivots by bearing means 118 about a vertical axis which laterally pivots about bearing means 119 which is in turn connected by lever 122 and universal joint 124 to easel tilt means 109a consisting of lever 126 and pivoted joint 135 to easel 33. The easel tilt means 109a and horizontal tilt means for negative support is actuated by turning of handwheel 53 connected by gear means 154, 152, 148, 146 and shaft means 156, 150 and 144 to a transverse gear actuated means by reciprocable gear means 133 on the splined end of shaft means 144 which operably connects by gear means 130 to worm shaft 127 which is positioned transversely of the rectifier which operates by screw follower means 128 and tilt lever 104. Gear means 132 on shaft 127 operably contacts gear means 134 on worm shaft 136 to drive screw follower 137 pivotally connected to easel tilt bar 105, of FIGS. 1, 4, 5, 6, and 7. Tilt mechanism 300a insures that the tilt of negative carrier 41 and easel 33 are continuously coordinated with lens 31 to insure that each of the planes of members 41, 31 and 33 all continuously intersect in a common line to insure sharp focus of the projected image on easel 33.

Negative carrier 41 lies in a vertical plane and may be rotated 185 degrees in either direction in its own plane as indicated by scale 46. It may also be canted with respect to the optical axis of projection lens 31 about vertical negative axis 35 at the surface of the negative perpendicular to and intersecting the optical axis, shifted laterally in its own plane 35 in a direction parallel to its vertical axis of cant or rotation and shifted laterally in its own plane in a direction perpendicular to the axis of cant. Shifting of negative carrier 41 parallel and perpendicular to its axis of rotation is accomplished by handwheels 51 and 53, respectively. The rotating of negative carrier 41 about a vertical axis 35 is accomplished automatically by the autofocusing and tilt control levers whenever the easel 33 is tilted for desired rectification. Negative carrier 41 also moves in conjunction with lens 31 along its optical axis to provide for the different desired magnifications. Film spool brackets 44 and 45 are provided on the sides of negative carrier 41 for holding film spools 60 and 61 of suitable size.

FIGS. 1, 19 and 20 illustrate stage plate 42, pressure plate 43 and film spool brackets 44 and 45 of negative carrier 41. Scale 46, FIG. 20, registers rotation of negative carrier 41 about a longitudinal, horizontal axis and may be read directly to the nearest five minutes of arc or other desired accuracy, and is provided with companion scale 46a to indicate the angle of rotation of negative carrier 41. Negative carrier 41 may also be canted about a vertical axis in negative plane 35 with respect to the optical axis of projection lens 31, shifted laterally in its own plane in a direction parallel to the axis of cant or rotation and moved along the axis of projection of the horizontal portion of lens ray 32.

Under rectification conditions negative carrier 41 is rotated or canted about a vertical axis automatically by the coaction of the tilt control mechanism 300a and parallel bar inversor 108a, and operates in conjunction with the tilt of easel 33, as illustrated by FIGS. 4, 5, 6, 7, 8, 9, and 10. Shifting of negative carrier 41 parallel and perpendicular to the axis of cant is accomplished by operation of handwheels 51 and 52, respectively. Negative carrier 41 may be shifted parallel to the axis of cant at least a distance of ±60 mm. and perpendicular to the axis of cant at least a distance of −50 mm. to +1 mm. Carrier 41 may be laterally adjusted by turning handwheel 48a to actuate lateral slide means 48 to laterally displace negative carrier 41 from its central axis position. Scale 55 of FIG. 1 is provided to indicate the perpendicular displacement of negative carrier 41 and may be read to at least the nearest 0.1 mm. or desired value. Negative carrier 41 moves substantially along the horizontal portion of the projection of lens ray 32 of projection lens 31 in conjunction with the movement of lens 31 in such a manner that the rectified projected image on easel 33 is always in sharp focus.

Handwheel 51 operates simultaneously and in unison the autofocus mechanism, shaft means 58, ratio scale mechanism 79, and shaft means 58a. The autofocus mechanism 108 operates a gear and screw driven four bar parallel linkage inversor means 108a, of FIGS. 1 and 10, to automatically position the negative carrier support 41a longitudinally of rectifier 34, and also operates gear means 167 and 168 cooperating with shaft means 58a to simultaneously connect ratio scale means 79 and gear train means 97 which cooperatively drives shaft means 100 and lens carriage means 76 of FIGS. 1, 3, and 12. Negative carrier support means 41a comprises shaft means 125 within tubular member 145, and laterally supported bearing means 178 terminating in a lateral screw actuated slide adjustment means 48 operated by handwheel 48a. Screw slide adjustment 48, of FIG. 1, carries negative support member 180 of support means 41a secured to negative carrier 41. FIG. 10 illustrates the scissor inversor 108a of the autofocus mechanism 108 comprising a four bar linkage of members 49 and is secured by pivot means 109 and 110 and lateral pivot points 600, link means 116a, bolt means 113 and member 111a to frame of rectifier 34. Movable pivot point 109 of the four bar linkage is connected by bolt means 112, bar means 117 and bearing means 117a to tubular support member 145 and rotatable shaft member 125. The four bar linkage is operatively connected by a diagonal composed of linkage members 47 pivotally connected at a medial pivot point 601 by screw follower means 143a to the threaded portion of splined shaft 144a, the splined portion of which is substantially carried by bearing means 146a and connected by pivotal means 147a, block means 149 connected by bolt means 149a to lever member 153a. Lever member 153a is connected by bolt means 112 to member 117 secured to support means 145 connected to negative carrier support adjustably positioned on slidable carriage means 160, of FIG. 1, comprising base member 164 slidably mounted on guide members 166. Base member 164 is secured by bolt or other suitable means to transverse slide means 48. Gear 169 is slidably carried by shaft 144a. Screw follower means 143a is operably connected by shaft 144a, bevel gears 169 and 171, to shaft means 173 which is in turn operably connected by bearing means 173a, bevel gears 175 and 177 to shaft 58 which is in turn connected to handwheel 51. As handwheel 51 is rotated, the negative carrier 41 is adjustably moved longitudinally of rectifier 34 by inversor mechanism of FIG. 10 to insure sharp focus at all times.

Negative carrier 41 is canted about its vertical axis by lever 106 which is telescopically connected by joint means 120 to lever 104, connected at its distal end by a pivotal screw follower means 128 operably connected to transverse thread actuating means 127 operated by wheel 53. It is to be noted, by this novel arrangement, that the effective radius of lever 106 is variable due to the action of the autofocus mechanism. As screw means 127 is revolved and the angle of bar 106 is varied by handwheel 53, the distance between screw follower means 128 and rotatable support shaft means 125 of negative carrier means 41 is lengthened or shortened by the reciprocal coaction between members 104 and 106 through sleeve joint connection 120, FIG. 4, to locate the position of negative carrier 41 for sharp focus. Likewise, as the autofocus mechanism is operated, the tilt of the easel 33 is automatically varied from its original tilt setting to continuously satisfy the "Scheimpflug" principle of sharp focus. The effective radius of swing of tilt bar 139 is varied by the telescoping coaction between members 105 and 139 by guide retaining means 176 secured to the end of member 139.

Easel 33 may be of any desired size and of a vacuum or other desired type of easel. If of a vacuum type, the vacuum may be supplied to the easel by a light vacuum pump which may be connected to easel 33 by means of a wire-reinforced, flexible hose or other suitable means. Easel 33 is positioned in substantially a horizontal plane and has provision for tilt correction by rotation about a single horizontal axis y—y by end bearing means 140 and 142, FIGS. 1 and 7. Easel 33 is connected by folded pivotal means at joint 135 to member 126. Member 126 is operably connected by universal joint members 124, FIG. 5, which is also folded pivotally and connected by lever member 122 and pivot means 119 to member 139 which pivots about axis means 118 as easel 33 is operated by the auto-tilt mechanism actuated by handwheel 53.

In the operation of rectifier 34, the tilt correction of the aerial negative is computed by well known rectification formulas, as for example, the formulas as given on pages 461, 462 and 463 of the Manual of Photogrammetry, Second Edition, published by the American Society of Photogrammetry, Box 286, Ben Franklin Station, Washington, D.C. The calculated value of the overall tilt correction of the negative is set into tilt scale 82 of FIG. 1 by turning handwheel 53 which operates by shaft means 144, screw drive means 127 connected by screw follower means 128. Follower 128 operates lever 106 and gear 134 operably connected to shaft 136 and screw follower means 137 which operates lever 105 is selectably connected through sheath 176 to lever 139 carrying folded pivoted lever 122 connected by universal joint means 124 to tilt lever 126 and pivot means 135 to operably tilt easel 33 and at the same time rotate or tilt the negative carrier 41 about its vertical axis 35 to assure that the "Scheimpflug" condition is satisfied to provide sharp focus of lens 31 for each setting of desired magnification of rectifier 34 to ratio scale 80. The desired magnification is operatively and synchronously set into rectifier 34 by the turning of handwheel 51, which also automatically operates at the same time the inversor 108a, FIG. 10, to move negative carrier 41 and support 180 attached by tubular member 145 to member 117 along the horizontal axis of lens 31. Handwheel 51 is also operably connected by universal shaft 58a to operate by gear means 167 and 168 connected to shaft 100 which also synchronously operates ratio scale means 79 and is at the same time connected by shaft 58a, which is in turn operably connected by shaft 100 through gear train means 97 to worm drive means 92 which operates ratio scale mechanism 79 and shaft 100 directly and at the same time operates lens carriage means 76 which positions lens 31 synchronously to assure correct focus of lens 31. In other words, when wheel 51 is correctly turned, it automatically positions in synchronism the negative carrier 41 and lens 31 along the horizontal axis of lens 31 and also operates in synchronism ratio scale means 79 to assure a correct setting of desired magnification. Tilt correction is set into rectifier 34 by synchronous operation of ratio scale means 79 and tilt correction scale 82, as illustrated by FIGS. 1, 4, 5, 6, 7, and 10.

Folded tilt means 109a comprises in general lever means 139, pivot means 118 and 119, lever 122, universal joint means 124, lever 126 and pivot means 135.

Inversor mechanism 108a positions negative carrier 41 longitudinally of the rectifier and is supported by carriage means 170 mounted on roller means 172 upon track means 174, of FIG. 4, as the axis 35 of negative carrier 41 is automatically positioned in its respective focal position corresponding to the desired magnification as indicated by ratio scale means 79 upon adjustment of handwheel 51.

Further novelty of instant invention resides in the interdependent operation of the easel tilt and tilt of negative carrier 41, controlled by turning of wheel 53 and the autofocus mechanism 108, and magnification ratio scale means 79, controlled by turning wheel 51. For example, the interdependent action of wheel 53 and wheel 51 coacts on the negative carrier means 41 through pivot bearing means 117a of FIG. 5. The easel tilt means and the negative carrier horizontal tilt means operated by handwheel 53 is connected to vertical shaft means 125 of negative carrier by lever connection means 106 of FIGS. 4 and 5, while the ratio scale means 79 and autofocus means 108 is operated by the turning of wheel 51 which is also connected to rotatable vertical shaft 125 by lever 117, bearing means 117a, to the lower end termination of rotatable shaft means 125, as illustrated in FIG. 5.

For example, to more fully illustrate the interdependence and coaction of the turning of wheel 51 and wheel 53 to produce a novel end result in the form of a reliable and accurate rectification of an aerial negative, the aforementioned tilt correction is set into the easel tilt scale 82 by wheel 53 and then the desired magnification is set into the ratio scale means 79 by wheel 51, then both wheels 51 and 53 may be finely adjusted by slight turning until the correct and desired reading of both the ratio scale means 79 and inversor tilt scale 82 are obtained. The autofocus mechanism of FIGS. 1, 4, 5, 6, and 10 is operably connected by a four bar type of parallel linkage 108a and adjustable lever means 117 to negative support shaft 125 to vary the position of negative carrier 41. As handwheel 51 is turned, gear and screw means are actuated to operate linkage 108a and lens carriage 76 set to the magnification of the ratio scale means 79 to synchronously vary the distance between the lens carriage 76 and negative carrier 41 to obtain a continuing sharp focus of the rectified negative image on easel 33.

Stage plate 42, FIG. 19, supports the film negatives and has four fiducial lines engraved on its outer surface to permit proper orientation of the negative within negative carrier 41.

Pressure plate 43, FIG. 19, holds the film or negative in proper orientation during exposure or projection. Turning of knob 56, FIG. 1, applies or releases the pressure of plate 43 whenever the lamp housing 57 is closed. Knob 56 when pulled out, releases the lamp housing 57 and allows it to be swung open for insertion or removal of film spools 60 and 61 on brackets 44 and 45, respectively.

In FIGS. 1, 19, and 20, duplicate film brackets 44 and 45 are provided for holding the sides of negative carrier 41 and for holding film spools 60 and 61 for suitable widths and lengths of aerial film. Spool 60, of FIGS. 19 and 20, is contained by two opposing spindles 64 and 65, each attached to rotary cranks 62 and 63, respectively, as shown. Either of cranks 62 or 63 may be used to drive or operate film spool 60. Spool 61 is similarly operated as spool 60. Spindle 64 may be retracted by cap nut 66 and spindle 65 is retracted by cap nut 67 for insertion or removal of spool 60.

Light source 70 of FIG. 19 may be of any suitable type having forced ventilation if necessary as indicated by member 71 of FIG. 1.

The projection system of rectifier 34 consists of a rectifier lens 31 having a desirable focal length and lens opening with a usable angular field of at least 80 degrees and a surfaced mirror 30 mounted so that the image projection is reflected from the horizontal portion of lens ray 32, FIG. 1, through substantially a 90 degree angle onto easel 33. Lens 31 may be of a four element metrogon or other suitable type of lens. Lens 31 is mounted in a lens board 72 or other suitable enclosure, which is in turn held in operative position in lens truck extension 73 by screws, clips or other suitable means. The internodal distance, as determined, (for example, 30 mm.) of lens 31 may be represented by NN′ in which N represents the nodal point at which the light ray of the negative image enters lens 31 and N′ represents the nodal point at which the light ray of the image leaves lens 31. The internodal distance NN′ for lens 31 is given by the lens manufacturer or may be measured, calculated and determined on an optical bench by one skilled in the art.

Lens 31 is provided with an iris diaphragm having a suitable and desired graduation. Lens 31 is provided with a suitable barrel 74 having means by which a light filter may be attached to barrel 74 to cover lens 31. Lens truck 76 is moved along guide support means 158 and 159 by which the lens carrier 73 is supported by sleeve or guide members 88 and 91, each of which are supported by roller bearing means 93 and tubular members 158 and 159, as shown in FIGS. 1, 3, 12, and 13, and move along the horizontal axis of lens ray projection 32 in conjunction with the negative carrier 41 by turning wheel 51 manually or by other suitable actuating means, such as an electric motor connected to gear spindle 16, FIG. 2, to change magnification.

Ratio scale device 79 is unique in that it indicates the magnification or ratio distance along the optical axis 32 between lens plane 75 and easel plane 33a (top plane surface of easel 33) to the distance along the optical axis 32 between the negative plane 35 and lens plane 75. Ratio scale device 79 is very versatile, in that it may be used with rectifier lenses 31 which may vary at least ±¼ inch from the desired nominal focal length and at least ⅛ inch in nodal point separation. Ordinarily, in the conventional rectifier, a different magnification or ratio scale would be needed for each rectifier lens of different focal length.

Functionally, ratio scale mechanism 79 is adapted for a rectifier lens having a desired focal length, for example, the ratio or magnification scale 80 may be based on a 14 inch nominal focal length lens, and consists of base plate ratio scale 89, as illustrated in FIG. 14, which may be calibrated in any desired percent of accuracy of ratio of image to object magnification with vernier ratio scale 78 which reads at least ⅒ of 1 percent. Scale 80 is attached as a base plate scale to lens truck member 91 which moves along vernier magnification scale 78 during any desired change of magnification setting of lens 31. Ratio scale 80 may be used with rectifier lenses having different nominal focal lengths without the use of a separate ratio scale with each different rectifier lens. However, for lenses having a focal length different from a designated or desired focal length of lens, provisions are made so that ratio scale 80 may compensate for the variation in focal length by means of sliding indicator nut 90. Vernier scale 78 is actuated by a multipivoted U-shaped lever member 94 actuated by worm drive 92 which also moves vernier 78 slightly by worm drive means 92 during the movement of lens 31 to fully compensate for the required difference in the distance between graduations between indexes of scale 78 and scale 80. U-shaped lever member 94 pivots permanently about axis 163 of pivot means 162 and actuates vernier means 83 about axis 165 of indicator nut means 90 of FIG. 16, which may vary in position according to the setting of member 90 on vertical focal length scale 84, thereby permitting the operation of axis 165 either above or below axis 163 according to the setting of member 90, FIGS. 14, 15, 16, and 18. The novelty of the ratio scale device 79 resides particularly in the novel use of multipivoted U-shaped member 94 in conjunction with scales 78, 80, 84, 85, and 86. To set ratio scale device 79 for operation with lens 31 having a certain focal length and nodal point separation, index 89 of focal scale 86, FIG. 11, is set opposite the nodal separation value NN' of lens 31, calculated by appropriate formula or given by lens manufacturer, to index value on nodal scale 85 which is solidly and adjustably attached to lens truck assembly 76. Then index 81 of ratio scale 80 is set to the focal length of lens 31 on focal scale 86. Indicator nut 90 is then moved opposite to the value of focal length of lens 31 on vertical focal scale 84 of vernier 83, which is actuated by U-shaped lever 94. Then index reading 1.0 on magnification scale 80 may be set opposite index 1.0 on horizontal scale 78 of vernier 83, FIGS. 1, 11, 12 and 13 by releasing setscrews 102 of FIG. 21 and removing locking washers 111 engaging nut member 102a and then manipulating nut 102a carried by worm drive 100 until ratio scale means 79 of rectifier 34 is in proper adjustment for use. The small movement of vernier 78 compensates for the different distances between the scale graduations of scales 78 and 80 that are required for different focal length lenses. The novel calibration means 101 of FIGS. 11, 12, and 21, connects the ratio scale mechanism 79 on lens carriage 76 with worm drive means 100 and provides quick setting and calibration of ratio scale 80 with horizontal vernier scale 78. Worm drive 100 is operably connected by gear means to differential drive shaft 58a which operates in response to the turning of handwheel 51. Shaft 58 is operably connected to gear means which operates the rectifier lens autofocusing mechanism. The autofocusing mechanism, as shown by FIGS. 1, 4, 5, 6, 7, and 10, of rectifier 34 operates in such a manner that the negative plane 35, lens plane 75 and easel plane 33a or top of easel 33 all intersect in a common line for sharp focus of the rectifier image to produce sharp imagery and to assure that the resulting negative image transformation fulfills all projective requirements in all applications of the present invention to photogrammetry, its related arts and instrumentalities. Worm drive 100 of FIG. 1 is also operably connected by gear train means 97 to worm drive 92 which operates the multipivoted U-shaped member 94 of FIG. 16, which actuates the aforementioned ratio scale mechanism generally designated as reference numeral 79.

The functional operation of the autofocus mechanism may be described as follows: When the rectifier is set to 1:1 magnification or zero tilt, as described above, for proper adjustment of the ratio scale device, the center arms or tilt levers 104 and 105 and inversor members 47 and 49, FIGS. 4 and 10, should be shown in a straight aligned position as illustrated by FIG. 4 so that the value of distance "L" may be mathematically expressed by the following formula:

$$L^2 = M^2 - f^2$$

where $L$ = the effective length of center arm 47, FIG. 10;
$M$ = the effective length of outer arm 49, FIG. 4; and
$f$ = focal length of rectifier lens 34 designated as either "$a$" or "$b$" of FIG. 4.

Proper focal adjustment of rectifier 34 may be accomplished by loosening and adjusting nut and screw means 112 and 113 in slot means 114 and 115, respectively, and varying the value of "L" until $L^2 = M^2 - f^2$ is true for all values of "L." Scale 116, FIG. 10, is also provided to facilitate proper adjustment of nut and screw means 113 to make refined adjustments in properly setting rectifier 34 to the correct initial focal length of lens 31.

The distance of pivot 109 of inversor 108a to pivot point 400 of negative plane 35 is designated in FIG. 4 by distance "$a$" or "$b$," each of which is equal to the given focal length of lens 31 or the distance from lens plane 75 to negative plane 35 is equal to $2a$ or $2f$, which in value is equal to twice the given focal length of lens 31. Likewise, when the rectifier 34 is in proper adjustment, the distance from pivot point 118 of tilt converter 34 to pivot point 110 of rectifier 34 is represented by distance "$b$" which is also equal to "$f$," the focal length of lens 31 and the distance from easel plane or top of easel 33 to lens plane 75 is substantially equal to $2b$ or twice the focal length, "$f$." The distance between the negative plane 35 and easel plane of 33 is equal to $4f - NN'$, in which "$f$" equals the focal distance of lens 31 and NN' equals the internodal distance (as explained above) of lens 31.

Carriage means 170 by its central structural means 246, supports both the autofocus means 108 and its subassembly inversor means 108a of FIG. 10, as shown in combination in FIGS. 4, 5, and 6. Carriage means 170 is unique in that it prevents lateral and longitudinal misalignment of the inversor means 108a and autofocus means 108 to hold all mechanical movements of the rectifier 34 within close tolerance to assure proper rectification and sharp focus of the projected negative image on easel plane 33a at all times during use of rectifier 34. Carriage means 170 is composed of cross member 246 which centrally carries, by bolt means or other suitable support means 240, 242 and 248. Support member 242 carries by bolt or other suitable bearing means 244 for the distal end of shaft 127. Member 240 serves as central bearing means for shaft 136. The central support pivot means 250 for scissor inversor means 108a which is supported by pivot means 143a, is centrally supported by support means 248 secured by bolt means to cross member 246 of carriage 170. The ends of carriage member 246 is vertically supported by end support members 232 and 245 and roller means 172 and 172a which in turn is supported by side bearing means 174 and 174a secured by bracket, bolt, rivet or other suitable means to the framework of rectifier 34. Member 245 serves as bearing means for end of shaft 136 and support roller means 225 which contacts as guide means the bottom surface of member 174 and the smooth top portion of rack means 226. Member 232 serves as bearing means for shafts 127 and 136 and fixedly carries support means 236 which carries rollers 234 and 234a on vertical axes, which bear on opposite sides of member 174a and restrain lateral movements of the carriage 170. Member 246 is aligned by rack means 226 and 226a and shaft means 238 which fixedly carries at its opposite ends gear means 228 and 230 which teeth intermesh with the teeth of the geared surface of the bottom surface of gear rack means 226 and 226a, to insure that the opposite ends of member 246 move at all times perpendicular to the longitudinal centerline of rectifier 34 to produce correct alignment of the carriage means 170 during its horizontal movement. Carriage 170 is unique in that its vertical movements are restrained by roller means 172, 172a and 225 and gear means 228 and 230. Side movements of carriage means 170 are restrained by roller means 234 and 234a, and the ends of member 246 are at all times maintained by gear means 228 and 230 and rack means 226 and 226a in alignment during horizontal movement of carriage means 170 to assure correct operation of the inversor and autofocus mechanisms within desired tolerance permitting correct rectification of aerial photographs taken at high altitudes and under varying weather conditions.

During operation of the multiple tilt control mechanism 300a, tilt control levers 104 and 105 telescope into bearing guide means 120 and 176, respectively. Lever 106 rotates the negative carrier 41 about a vertical plane 35 and is attached directly to negative carrier spindle 125. Lever 120 is actuated by upper tilt screw 127 and nut follower means 128 through lever 104 which is operably connected by gear means 130 through bevel gear means 133 connected to shaft 144 which is operatively connected by gears 146 and 148 to shaft means 150 connected by gear means 152 operatively coacting with gear 154 connected to stub shaft 156 carrying handwheel 53. Simultaneously, the easel tilt lever 176 is actuated by screw follower means 137 in an opposite lateral direction by lower tilt screw means 136, which is operably connected by gear means 132 and 134 directly to upper tilt screw means 127 connected by gear means 130 and 133 to splined shaft 144 which is in turn operably connected by gear means 146 and 148 to shaft 150, which is operably connected by gear means 152 and 154 to spindle 156 and handwheel 53. Lever 176 is also operably connected to plate or lever member 139 which pivots by bearing means 118 about a vertical axis and carries laterally pivot bearing means 119 which is in turn operably connected through lever means 122 to universal joint means 124 which is connected to lever means 126 which is in turn cooperatively connected by pivotal joint 135 to easel 33. Joint means 124 therefore provides a unique, accurate, operable and flexible actuating folded universal connection between the horizontal planar tilt lever 139 and the non-coplanar easel 33 which tilts or rocks about an axis, subtended at its ends by pivot bearing means 140 and 142, in response to the turning in either direction of handwheel spindle 156.

Handwheels 51 and 53, as other handwheels of FIG. 1, may be each replaced by suitable controlled motors which may be directly or remotely controlled by suitable actuating and control means.

While there has been described what is at present considered to be the preferred embodiment of this invention, it will be obvious to those skilled in the art that various changes and modifications may be made therein without departing from the invention.

I claim:

1. A photogrammetric rectifier comprising a lens system having objective lens means and reflecting means cooperating with said lens system, easel means for receiving an image produced by said lens system and reflected by said reflecting means, a horizontally disposed scissor inversor means disposed below said easel and connected to said lens means and said easel means, and negative support means including carriage means operatively interconnecting said negative support means and said inversor means whereby said negative, object lens and easel planes intersect in a straight line, an image magnification adjusting mechanism, reciprocable lens carriage means cooperatively interconnecting said objective lens means and said image magnification adjusting mechanism, a lens focal length compensation mechanism, interlinking proportioning linkage means operatively interconnecting said lens focal length compensation means to said image magnification adjusting mechanism, and a tilt compensation mechanism interconnecting said inversor means and said easel means for correction of aerial negatives to accurately produce rectified aerial photographs.

2. A photogrammetric rectifier comprising a lens system having object lens means and reflecting mirror means cooperating with said lens system, easel means for receiving an image produced by said lens system and reflected by said mirror means, horizontally disposed scissor inversor means located below said easel and connected to said lens system and said easel means, and negative support means including carriage means operatively interconnecting said negative support means and said inversor means whereby said negative, object lens and easel planes intersect in a straight line; an image magnification adjusting mechanism operably connected to said object lens means, horizontally disposed reciprocable lens carriage means cooperatively interconnecting said object lens means and said image magnification adjusting mechanism, lens focal length compensation mechanism, U-shaped interlinking proportioning linkage means operatively interconnecting said lens focal length compensation mechanism to said image magnification adjusting mechanism, and a tilt compensation mechanism interconnecting said inversor means and said easel means for correction of aerial negatives to accurately produce rectified aerial photographs.

3. A photogrammetric rectifier according to claim 2 wherein said tilt mechanism comprises a substantially vertically disposed right angle linkage mechanism pivotally interconnecting said easel to said inversor mechanism.

4. A photogrammetric rectifier comprising lens means, having a vertical object lens plane, easel means for receiving an image, mirror means intermediate said lens means and said easel means, lens carriage means adjustably supporting the object lens of said lens means and being cooperatively interlinked by mechanical linkage to said easel, negative carriage means interconnected by mechanical linkage to said easel, said mirror means being positioned to reflect the light passing through said lens means to said easel, scissor inversor means interconnected by adjustable carriage means and mechanical linkage to said negative carriage means, image magnification adjusting mechanism interlocking by mechanical linkage said inversor to said lens carriage, a lens focal length compensation mechanism, a U-shaped interlinking proportioning linkage means operatively interconnecting said lens focal length compensation mechanism to said image magnification adjusting mechanism; structurally interrelated mechanical linkage means interconnecting said inversor mechanism and said lens means to said easel to insure that the negative plane, lens plane and easel planes all continuously intersect in a common line, and tilt compensation mechanism connected to said inversor means for correction of aerial negatives to accurately produce rectified aerial photographs.

5. A photogrammetric rectifier comprising a frame support structure, a lens means, a negative retaining means and an adjustable support means supporting said lens means, easel means for receiving an image from said lens means, mirror means intermediate said lens means and said easel, scissor inversor means interconnected by mechanical linkage to said lens means and said easel means, carriage means interconnecting said scissor inversor and said negative retaining means whereby said negative, lens and easel planes all optically intersect in a common line, a lens focal length compensating mechanism including a horizontally and vertically adjustable indexed plate carried by said frame support structure, horizontally adjustable image magnification adjusting mechanism supported by said frame support structure and including horizontally positioned indexing means adjacent to and cooperating with said vertically indexed plate of said focal length compensating mechanism, said image magnification adjusting mechanism interconnecting said lens support and said inversor means, linkage means including a U-shaped interlinking proportioning member interconnecting said vertically adjustable indexed plate and said horizontally adjustable image magnification adjusting mechanism, and tilt mechanism for said easel interconnected by said scissor inversor to said carriage means for maintaining sharp focus of rectified negatives on said easel.

6. A photogrammetric rectifier according to claim 5, and further comprising an adjustable calibration means including a traveling thread means and cooperating locking detent means interconnecting said image magnification adjusting mechanism to its drive mechanism and said inversor means to calibrate the image magnification adjusting mechanism for image projection on said easel means.

7. A photogrammetric rectifier for aerial photographs comprising a frame support structure, vertical negative retaining means with adjustable support means; adjustable easel means for receiving an image; a lens system having a substantially vertical lens and horizontally reciprocating carriage means therefor; reflecting means for directing a lens ray substantially at a 90 degree angle intermediate said negative retaining means and said adjustable easel means; scissor inversor means connected to said lens system, a traveling horizontal carriage juxtaposed below said easel means having screw and follower linkage means interconnected to said inversor mechanism; a substantially horizontally folded tilt linkage mechanism interconnecting said easel means to said screw follower linkage of said traveling carriage means; a light source cooperating with said negative retaining means; an image magnification adjusting mechanism connected to said lens carriage; a lens focal length compensation mechanism; a U-shaped interlinking proportioning linkage means operatively interconnecting said lens focal length compensation mechanism to said image magnification adjusting mechanism; structurally interrelated mechanical linkage means interconnecting said inversor mechanism, said folded tilt mechanism and said lens means to insure that the vertical object plane, vertical lens plane and adjustable horizontal easel planes all continuously intersect in a common line; and tilt compensation mechanism interconnecting said folded tilt mechanism to said inversor through said traveling carriage means to accurately produce rectified aerial photographs.

References Cited in the file of this patent

UNITED STATES PATENTS

| | | |
|---|---|---|
| 1,126,353 | Becker | Jan. 26, 1915 |
| 1,391,807 | Swalm et al. | Sept. 27, 1921 |
| 1,911,142 | Cahill | May 23, 1933 |
| 2,160,277 | Neidich | May 30, 1939 |
| 2,257,581 | Ulsheimer | Sept. 30, 1941 |
| 2,437,898 | Swanson | Mar. 16, 1948 |
| 2,782,678 | Taylor | Feb. 26, 1957 |

FOREIGN PATENTS

| | | |
|---|---|---|
| 618,837 | Germany | Sept. 17, 1935 |
| 624,862 | Germany | Jan. 30, 1936 |
| 718,046 | Germany | Mar. 4, 1942 |
| 918,167 | France | Jan. 31, 1947 |

OTHER REFERENCES

"Bausch & Lomb Photogrammetric Equipment," Catalog F-301, published by Bausch & Lomb (New York), December 1953, pages 20-21.